United States Patent
Fukami

(10) Patent No.: US 10,982,647 B2
(45) Date of Patent: Apr. 20, 2021

(54) VORTEX GENERATOR, INSTALLATION METHOD FOR THE SAME, WIND TURBINE BLADE, AND WIND TURBINE POWER GENERATING APPARATUS

(71) Applicant: MITSUBISHI HEAVY INDUSTRIES, LTD., Tokyo (JP)

(72) Inventor: Koji Fukami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 154 days.

(21) Appl. No.: 15/602,883

(22) Filed: May 23, 2017

(65) Prior Publication Data

US 2018/0202417 A1 Jul. 19, 2018

(30) Foreign Application Priority Data

Jan. 16, 2017 (JP) .............................. JP2017-005068

(51) Int. Cl.
  *F03D 1/06* (2006.01)
  *F03D 13/20* (2016.01)

(52) U.S. Cl.
  CPC .......... *F03D 1/0675* (2013.01); *F03D 1/0633* (2013.01); *F03D 1/0691* (2013.01);
  (Continued)

(58) Field of Classification Search
  CPC ...... F03D 1/0675; F03D 13/20; F03D 1/0633; F03D 1/0691; F05B 2230/60; F05B 2240/122; F05B 240/60; Y02P 70/523
  (Continued)

(56) References Cited

U.S. PATENT DOCUMENTS 8,162,590 B2  4/2012  Haag
9,051,919 B2  6/2015  Jensen et al.
(Continued)

FOREIGN PATENT DOCUMENTS

DE  102013201871 A1  8/2014
EP      2031241 A1  3/2009
(Continued)

OTHER PUBLICATIONS

Europe Patent Office, "Search Report for European Patent Application No. 17173674.7," dated Dec. 8, 2017.
(Continued)

*Primary Examiner* — Connor J Tremarche
(74) *Attorney, Agent, or Firm* — Manabu Kanesaka; Benjamin Hauptman; Kenneth Berner

(57) ABSTRACT

A vortex generator for a wind turbine blade includes a plurality of main fins disposed on a surface of the wind turbine blade; and at least one first sub fin having a fin chord length and a fin height which are smaller than those of each of the main fins, and disposed on the surface of the wind turbine blade along a first virtual line extending from a first end portion of a main fin row at a side of a blade tip or a blade root of the wind turbine blade. An expression $d \le d_{max}$ is satisfied, provided that d is a distance between the main fin row and the first sub fin disposed next to the first end portion of the main fin row, and $d_{max}$ is a maximum distance between an adjacent pair of the main fins in the main fin row.

15 Claims, 9 Drawing Sheets

(52) U.S. Cl.
CPC .......... *F03D 13/20* (2016.05); *F05B 2230/60* (2013.01); *F05B 2240/122* (2013.01); *F05B 2240/60* (2013.01); *Y02E 10/72* (2013.01); *Y02P 70/50* (2015.11)

(58) Field of Classification Search
USPC ...................................................... 416/236 R
See application file for complete search history.

(56) References Cited

U.S. PATENT DOCUMENTS

| | | | |
|---|---|---|---|
| 9,133,816 B2 | 9/2015 | Jensen et al. | |
| 9,273,667 B2 | 3/2016 | Enevoldsen et al. | |
| 9,556,849 B2 | 1/2017 | Riddell et al. | |
| 9,624,782 B2 | 4/2017 | Booth et al. | |
| 2010/0209258 A1 | 8/2010 | Fuglsang et al. | |
| 2011/0095537 A1* | 4/2011 | Numajiri ................ | F03D 7/0204 290/55 |
| 2011/0142673 A1 | 6/2011 | Fang et al. | |
| 2012/0257977 A1 | 10/2012 | Jensen et al. | |
| 2013/0129520 A1 | 5/2013 | Enevoldsen et al. | |
| 2014/0140856 A1* | 5/2014 | Madsen ................ | F03D 1/0641 416/236 R |
| 2014/0241880 A1* | 8/2014 | Madsen ................ | F03D 1/0658 416/1 |
| 2014/0328688 A1 | 11/2014 | Wilson et al. | |
| 2014/0328692 A1* | 11/2014 | Riddell ................ | F03D 1/0675 416/236 R |
| 2014/0328693 A1* | 11/2014 | Wilson .................... | F01D 5/02 416/236 R |
| 2014/0334938 A1* | 11/2014 | Riddell ................ | F03D 1/0633 416/236 R |
| 2015/0010407 A1 | 1/2015 | Zamora Rodriguez et al. | |
| 2016/0177914 A1 | 6/2016 | Enevoldsen et al. | |
| 2016/0215758 A1 | 7/2016 | Corten | |
| 2016/0327021 A1 | 11/2016 | Tobin et al. | |
| 2017/0138339 A1 | 5/2017 | Fukami | |
| 2017/0138341 A1 | 5/2017 | Fukami | |
| 2017/0248116 A1 | 8/2017 | Fukami et al. | |
| 2017/0248117 A1 | 8/2017 | Fukami et al. | |

FOREIGN PATENT DOCUMENTS

| | | |
|---|---|---|
| EP | 2484895 A1 | 8/2012 |
| EP | 2484896 A1 | 8/2012 |
| EP | 2484897 A1 | 8/2012 |
| EP | 2484898 A1 | 8/2012 |
| EP | 2548800 A1 | 1/2013 |
| EP | 2597300 A1 | 5/2013 |
| EP | 2799709 A1 | 11/2014 |
| EP | 2799710 A1 | 11/2014 |
| EP | 2871358 A1 | 5/2015 |
| JP | 2017-089526 A | 5/2017 |
| JP | 2017-089561 A | 5/2017 |
| WO | 2007/140771 A1 | 12/2007 |
| WO | 2013/014082 A2 | 1/2013 |
| WO | 2015/030573 A1 | 3/2015 |

OTHER PUBLICATIONS

Europe Patent Office, "Office Action for European Patent Application No. 17173674.7," dated Jan. 18, 2019.
Japan Patent Office, "Office Action for Japanese Patent Application No. 2017-005068," dated Aug. 6, 2019.

* cited by examiner

VORTEX GENERATOR, INSTALLATION METHOD FOR THE SAME, WIND TURBINE BLADE, AND WIND TURBINE POWER GENERATING APPARATUS

RELATED APPLICATIONS

The present application is based on, and claims priority from, Japanese Application No. JP2017-005068 filed Jan. 16, 2017, the disclosure of which is hereby incorporated by reference herein in its entirety.

TECHNICAL FIELD

The present invention relates to a vortex generator, an installation method for the same, a wind turbine blade, and a wind turbine power generating apparatus.

BACKGROUND ART

Approaches to improve aerodynamic performance of a wind turbine blade have been sought for some time to improve operation efficiency of a wind turbine. In one of the approaches, a vortex generator (VG) is disposed on a surface of a wind turbine blade to suppress separation of a flow along the surface of the wind turbine blade.

Patent Documents 1 to 10 disclose a vortex generator having a base plate to be mounted to a surface of a wind turbine blade, and a plurality of fins (VG fins) disposed upright on the base plate.

CITATION LIST

Patent Literature

Patent Document 1: EP2799710A
Patent Document 2: US Patent Application Publication No. 2014/0140856
Patent Document 3: EP2548800A
Patent Document 4: EP2799709A
Patent Document 5: WO2007/140771A
Patent Document 6: EP2031241A
Patent Document 7: EP2484898A
Patent Document 8: WO2015/030573A
Patent Document 9: EP2597300A
Patent Document 10: DE102013201871A

SUMMARY

A typical vortex generator includes a fin row formed by a plurality of VG fins, as described in Patent Documents 1 to 10. As a result of intensive researches by the present inventors, it was found that an effect to suppress separation cannot be sufficiently achieved at an end portion of a fin row of a vortex generator, and even worse, some VG fins disposed on an end portion of a fin row may form vortices in a direction away from the surface of the wind turbine blade, which may actually promote separation.

An object of at least some embodiments of the present invention is to provide a vortex generator, an installation method for the same, a wind turbine blade, and a wind turbine power generating apparatus, whereby it is possible to improve an effect to suppress separation, at an end portion of a fin row of a vortex generator.

(1) A vortex generator for a wind turbine blade, according to at least one embodiment of the present invention, comprises: a plurality of main fins disposed on a surface of the wind turbine blade; and at least one first sub fin having a fin chord length and a fin height which are smaller than those of each of the main fins, the at least one first sub fin being disposed on the surface of the wind turbine blade along a first virtual line extending from a first end portion of a main fin row at a side of a blade tip or a blade root of the wind turbine blade. An expression $d \leq d_{max}$ is satisfied, provided that d is a distance between the main fin row and the first sub fin disposed next to the first end portion of the main fin row of the at least one first sub fin, and $d_{max}$ is a maximum distance between an adjacent pair of the main fins in the main fin row.

At an end portion of a fin row of a vortex generator, it is difficult to achieve a sufficient effect to suppress separation, due to the influence of vortices generated by the fins in a direction away from the surface of the wind turbine blade.

In this regard, with the above configuration (1), the first sub fin being smaller than the main fins is disposed adjacent to the main fin row ($d \leq d_{max}$), and thus it is possible to enhance the effect to suppress separation at the end portion of the fin row of the vortex generator. Specifically, with the first sub fin, it is possible to cancel, at least partially, the effect to promote separation caused by the vortices in a direction away from the surface of the wind turbine blade formed by some main fins disposed on an end portion of the main fin row, as vortices formed by the first sub fin attract a relatively-fast flow outside the boundary layer toward the surface of the wind turbine blade. Furthermore, while the first sub fin itself may form vortices in a direction away from the surface of the wind turbine blade, the fin chord length and the fin height of the first sub fin are smaller than those of the main fins, and thus the influence of the vortices formed by the first sub fins are smaller than that of the vortices formed by the main fins. Thus, with the above configuration (1), it is possible to enhance the effect to suppress separation at an end portion of the fin row as the vortex generator as a whole.

(2) In some embodiments, in the above configuration (1), a fin chord length direction of the first sub fin which is farthest from the main fin row, of the at least one first sub fin, is inclined from the first virtual line so as to extend away from the main fin row toward a leading edge of the wind turbine blade.

With the above configuration (2), among the first sub fins disposed on the first virtual line extending from the main fin row, the first sub fin farthest from the main fin row is disposed so as to be away from the main fin row toward the leading edge side. Specifically, the fins (first sub fins) disposed on an end portion of the row of the vortex generator including the main fins and the first sub fins is disposed away from the main fin row as the fins get closer to the leading edge. Accordingly, at the end portion of the vortex generator, it is possible to suppress separation by attracting a relatively-fast flow outside the boundary layer toward the blade surface with vertices formed by provision of the first sub fin.

(3) In some embodiments, in the above configuration (1) or (2), the at least one first sub fin includes a plurality of first sub fins having the fin chord length and the fin height which decrease with distance from the main fin row.

With the above configuration (3), a plurality of first sub fins are provided, and formed to have a fin chord length and a fin height which decrease gradually with distance from the main fin. In other words, the fins do not terminate suddenly at the end portion of the main fin row, but the aerodynamic effect of the fins decreases gradually, and thus it is possible to achieve the effect to suppress separation suitably at the end portion of the fin row as the vortex generator as a whole.

(4) In some embodiments, in any one of the above configurations (1) to (3), the vortex generator further comprises a first base plate fixed to the surface of the wind turbine blade. The at least one first sub fin includes a plurality of first sub fins disposed upright on the first base plate.

With the above configuration (4), the plurality of first sub fins are disposed upright on the first base plate, and thus the first sub fins can be mounted to the wind turbine blade by merely mounting the first base plate to the wind turbine blade. Thus, it is possible to improve the workability for mounting the plurality of first sub fins to the wind turbine blade. Further, the first sub fins formed to have a size that decreases with distance from the main fin row are formed integrally with the first base plate, and thus it is possible to prevent the small fins from being lost, and to reduce the efforts for proper handling.

(5) In some embodiments, in any one of the above configurations (1) to (4), the vortex generator further comprises a first base plate fixed to the surface of the wind turbine blade. At least one of the main fins which forms the first end portion of the main fin row and at least one of the first sub fin are disposed upright on the first base plate.

With the above configuration (5), at least one first sub fin and at least one main fin are disposed upright on the first base plate. Specifically, at least one first sub fin and at least one main fin are formed integrally via the first base plate, and thus it is possible to reduce the man hours for mounting the vortex generator to the wind turbine blade, and to simplify the mounting work.

(6) In some embodiments, in any one of the above configurations (1) to (5), the first end portion is an end portion, disposed at the side of the blade tip of the wind turbine blade, of the main fin row.

With the above configuration (6), from the principle described in the above (1), it is possible to suppress the effect to promote separation with the first sub fin at the end portion of the fin row of the vortex generator, for a portion of the wind turbine blade that has a great influence on the aerodynamic performance (a portion closer to the tip than the blade root portion). Thus, it is possible to improve the aerodynamic performance of the wind turbine blade.

(7) In some embodiments, in any one of the above configurations (1) to (6), the at least one first sub fin is disposed so that a center of each of the first sub fin with respect to a fin chord length direction is on a line connecting respective centers of the plurality of main fins in the fin chord length direction.

With the above configuration (7), the aerodynamic effect achieved by the at least one first sub fin arranged on the extension line of the main fin row can be exerted efficiently on the end portion of the main fin row, and thus it is possible to improve the aerodynamic property of the wind turbine blade efficiently.

(8) In some embodiments, in any one of the above configurations (1) to (7), S1/S2 is at least 0.8 and at most 1.2, provided that S1 is a distance between an adjacent pair of the main fins at a leading-edge side, and S2 is a distance between an adjacent pair of the main fins at a trailing-edge side.

With the above configuration (8), basic units of the main fins are disposed at a substantially constant distance without being too apart or too close, and thus it is possible to achieve the effect to suppress separation substantially uniformly over the entire installation range of the vortex generator.

(9) A wind turbine blade according to at least some embodiments of the present invention comprises: a blade body; and the vortex generator according to any one of claims 1 to 8 mounted to a surface of the blade body.

With the above configuration (9), as described in the above (1), the first sub fin being smaller than the main fins is disposed adjacent to the main fin row, and thus it is possible to enhance the effect to suppress separation at the end portion of the fin row of the vortex generator. Thus, it is possible to provide a wind turbine blade with an improved aerodynamic performance.

(10) A wind turbine power generating apparatus according to at least some embodiments of the present invention comprises the wind turbine blade according to the above (9).

With the above configuration (10), the wind turbine blade having the configuration of the above (9) is provided, and thus it is possible to provide a wind turbine power generating apparatus with an improved aerodynamic performance.

(11) A method of installing a vortex generator on a wind turbine blade according to at least some embodiments of the present invention comprises: a step of mounting a plurality of main fins on a surface of the wind turbine blade; a step of mounting at least one first sub fin to the surface of the wind turbine blade, along a first virtual line extending from a first end portion of a main fin row at a side of a blade tip or a blade root of the wind turbine blade, the at least one first sub fin having a fin chord length and a fin height which are smaller than those of each of the main fins; and a step of determining a mounting position of the first sub fin so that d satisfies an expression $d \leq d_{max}$, provided that d is a distance between the main fin row and the first sub fin disposed next to the first end portion of the main fin row of the at least one first sub fin, and $d_{max}$ is a maximum distance between an adjacent pair of the main fins in the main fin row.

According to the above method (11), as described in the above (1), the first sub fins which are smaller than the main fins are disposed adjacent to the main fin row, and thus it is possible to enhance the effect to suppress separation at an end portion of the fin row of the vortex generator.

According to at least one embodiment of the present invention, it is possible to enhance the effect to suppress separation at an end portion of the fin row for the vortex generator.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
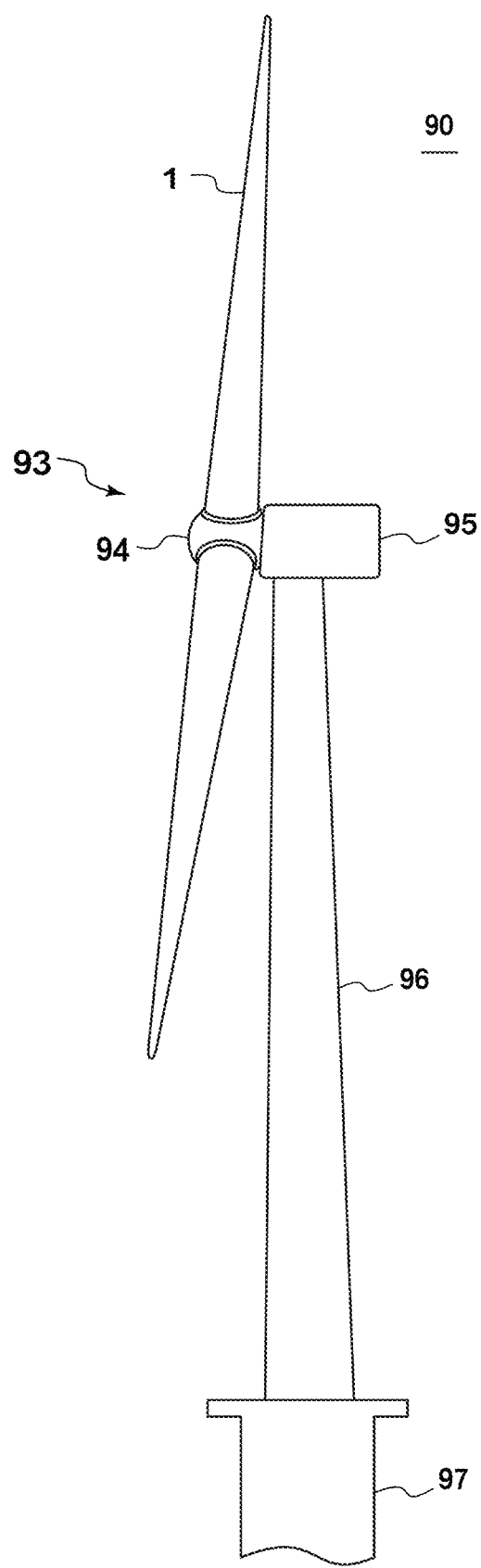
FIG. 1 is a schematic configuration diagram of a wind turbine power generating apparatus including a wind turbine blade to which a vortex generator according to an embodiment is to be applied.
Figure 2:
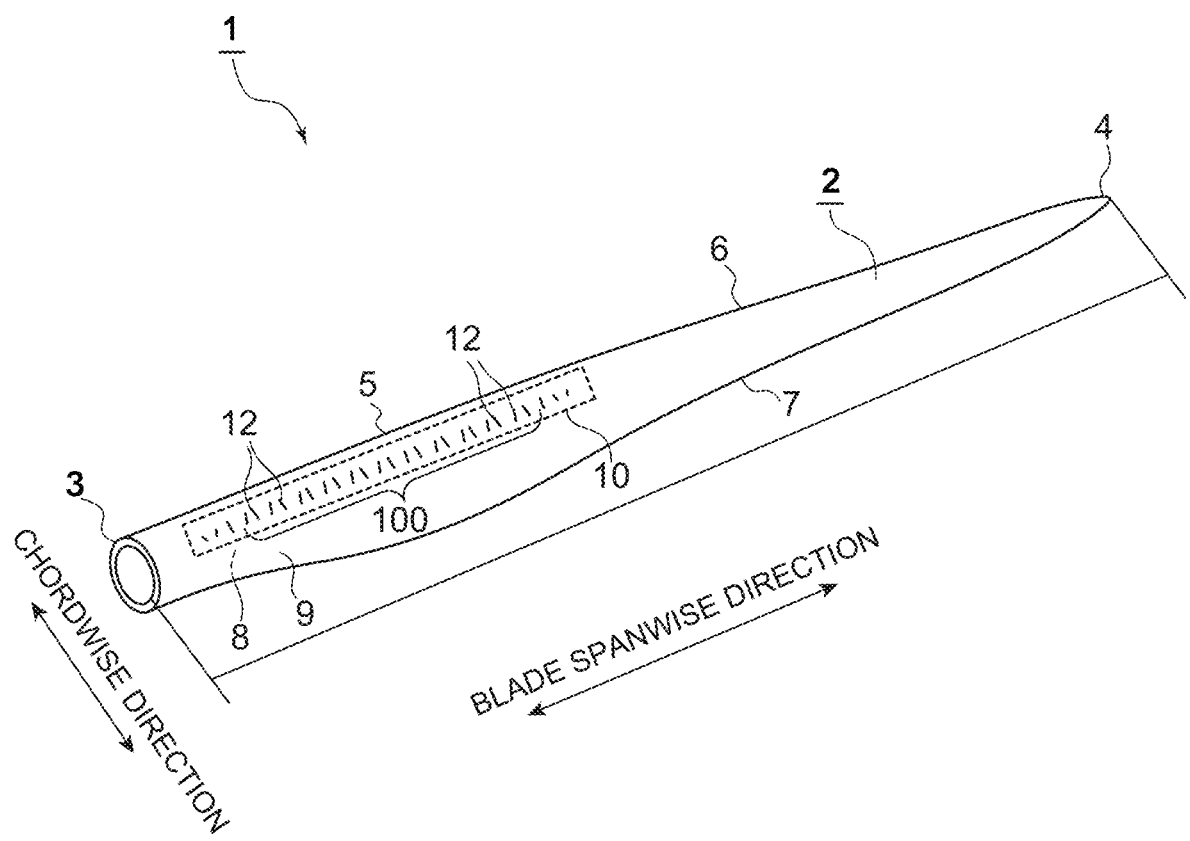
FIG. 2 is a perspective view of a wind turbine blade to which a vortex generator according to an embodiment is to be applied.

With reference to FIGS. 1 and 2, a wind turbine blade will now be described, to which a vortex generator according to some embodiments is to be applied. FIG. 1 is a schematic configuration diagram of a wind turbine power generating apparatus including a wind turbine blade to which a vortex generator according to an embodiment is to be applied. FIG. 2 is a perspective view of a wind turbine blade to which a vortex generator according to an embodiment is to be applied.

As depicted in FIG. 1, a wind turbine power generating apparatus 90 includes a rotor 93 including at least one (e.g. three) wind turbine blades 1 and a hub 94. The wind turbine blades 1 are mounted to the hub 94 in a radial fashion, the rotor 93 rotates in response to wind received by the wind turbine blades 1, and a generator (not depicted) coupled to the rotor 93 generates electric power.

In the embodiment depicted in FIG. 1, the rotor 93 is supported by a nacelle 95 disposed on an upper part of a tower 96. The tower 96 is disposed to stand upright on a base structure 97 (e.g. foundation structure or floating structure) disposed on water or on land.

As depicted in FIG. 2, the wind turbine blade 1 includes a blade body 2.

The blade body 2 includes a blade root 3 to be mounted to the hub 94 of the wind turbine power generating apparatus 90, a blade tip 4 positioned farthest from the hub 94, and an airfoil part 5 extending between the blade root 3 and the blade tip 4. The wind turbine blade 1 has a leading edge 6 and a trailing edge 7 from the blade root 3 to the blade tip 4. Further, an exterior shape of the blade body 2 of the wind turbine blade 1 is formed by a pressure surface 8 and a suction surface 9 disposed opposite to the pressure surface 8.

For the wind turbine blade 1 depicted in FIG. 2, vortex generators 10 are mounted to the suction surface 9 of the blade body 2. In the present specification, "blade spanwise direction" refers to a direction connecting the blade root 3 and the blade tip 4, and "blade chordwise direction" refers to a direction along a line (chord) connecting the leading edge 6 and the trailing edge 7 of the blade body 2.

In some embodiments, the vortex generator 10 includes a plurality of main fins 12 mounted to the surface of the wind turbine blade 1 (specifically, blade body 2). The plurality of main fins 12 form a main fin row 100.

Next, with reference to FIGS. 3 and 4, the specific configuration of the main fins 12 (12A, 12B) and the aerodynamic effect of the main fin row 100 will be described.

Figure 3:
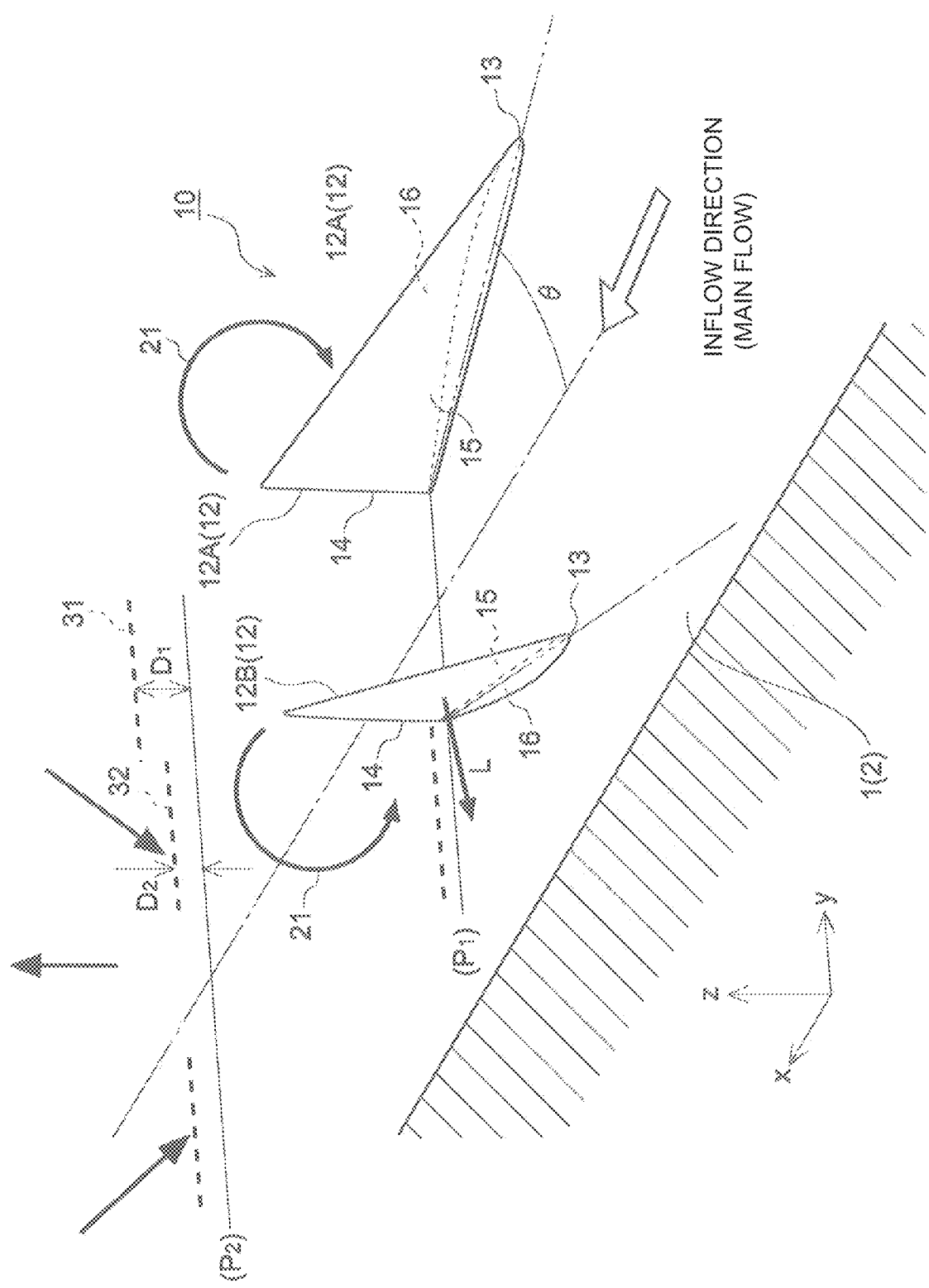
FIG. 3 is a perspective view for describing a flow around a main fin row according to an embodiment.

FIG. 3 is a perspective view for describing a flow around a pair of adjacent main fins 12A, 12B according to an embodiment. FIG. 4 is a velocity distribution diagram showing a result of fluid analysis around a pair of adjacent main fins 12A, 12B according to an embodiment.

Figure 4:
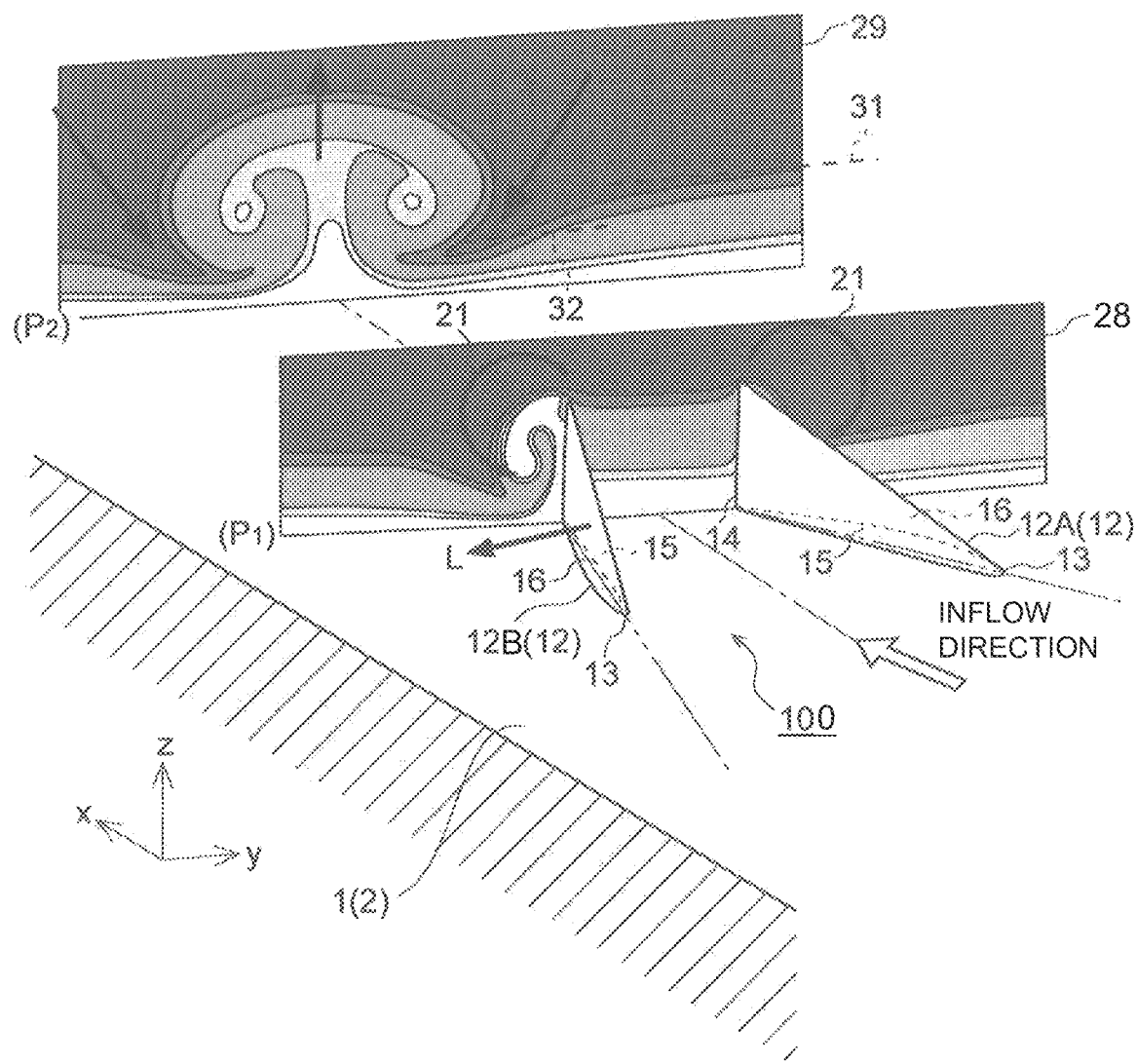
FIG. 4 is a velocity distribution diagram showing a result of fluid analysis around a main fin row according to an embodiment.

FIG. 4 shows a velocity distribution 28 in a cross section at a position $P_1$ of trailing edges 14 of the main fins 12A, 12B, which is a cross section orthogonal to the in-flow direction of wind, and a velocity distribution 29 in a cross section at a position $P_2$ on a downstream side of the main fins 12A, 12B, which is also a cross section orthogonal to the in-flow direction of wind. In the velocity distributions 28, 29, regions with a higher fluid velocity are shown in darker shading, and regions with a lower fluid velocity are shown in lighter shading.

In some embodiments, the plurality of main fins 12 include at least one pair of fins 12A, 12B disposed adjacent to each other (see FIGS. 3 and 4, for example). In some embodiments, the pair of main fins 12 (12A, 12B) each has an airfoil shape. Each main fin 12 includes a leading edge 13 disposed on an upstream side with respect to the inflow direction of wind, a trailing edge 14 disposed on a downstream side with respect to the inflow direction of wind, a pressure surface 15 of the fin 12 facing toward upstream with respect to the inflow direction of wind, and a suction surface 16 of the fin 12 facing toward downstream with respect to the inflow direction of wind. In this fin 12, the direction of a line connecting the leading edge 13 and the trailing edge 14 is the chordwise direction of the fin 12.

In the present specification, "in-flow direction of wind" refers to a direction of a flow along a surface of the wind turbine blade 1 (see FIG. 2) at a mounting position of the vortex generator 10. As an "in-flow direction of wind", a blade chordwise direction (see FIG. 2) of the wind turbine blade 1 at a mounting position of the vortex generator 10 may be used approximately.

In some embodiments, for instance, each of the main fins 12A, 12B may be disposed so that a gap between the pair of main fins 12A, 12B widens from upstream toward downstream with respect to the inflow direction of wind (i.e., from the side of the leading edge 6 toward the side of the trailing edge 7 of the wind turbine blade 1 (see FIG. 2) in a state of being mounted to the wind turbine blade 1).

As depicted in FIGS. 3 and 4, the main fin row 100 normally generates longitudinal vortices 21 on the side of the suction surfaces 16 of the main fins 12 (12A, 12B) with a lift L produced by the main fins 12. The longitudinal vortices 21, 22 promote momentum exchange between outside and inside of a boundary layer 31 at a downstream side of the main fins 12. Specifically, the boundary layer 31 at a position farther from the main fins 12 is affected less by the main fins 12 and thus has a thickness $D_1$ which is relatively large. In contrast, at a position closer to the main fins 12, the vortices 21 generated by the main fins 12 (12A, 12B) promote momentum exchange in the height direction of the fins 12, and thus the boundary layer 32 has a thickness $D_2$ that is smaller than the thickness $D_1$ of the boundary layer 31. Accordingly, the main fin row 100 reduces the thickness of the boundary layer 31 on the surface of the wind turbine blade 1, and thereby trailing-edge separation on the wind turbine blade 1 is suppressed.

It should be noted that the longitudinal vortices 21 refer to vortices formed in the height direction of the fins 12.

Although the main fin row 100 can achieve an effect to suppress trailing-edge separation of the wind turbine blade 1 as a whole, the present inventors conducted intensive researches and found that the main fin row 100 fails to achieve a sufficient effect to suppress separation locally at an end portion, and even worse, may promote separation at an end portion. This is due to longitudinal vortices 21 formed by the main fins 12A, 12B positioned on the end portion of the main fin row 100 having a component in a direction away from the surface of the wind turbine blade 1 between the main fins 12A, 12B, which promotes separation at the downstream side of the main fins 12.

In view of this, in some embodiments, the vortex generator 10 further includes sub fins 120 (120A, 120B) for enhancing the effect to suppress separation at an end portion of the main fin row 100, as described below with reference to FIGS. 5A, 5B, 6A, and 6B.

Figure 5A:
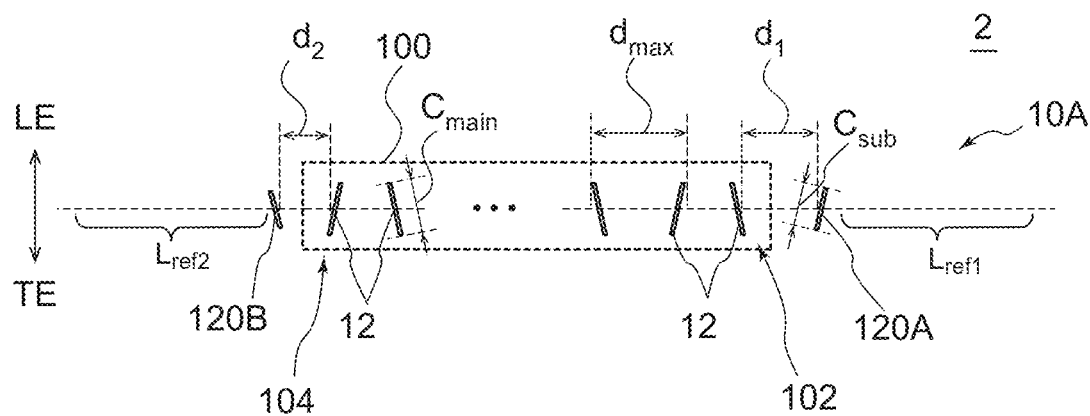
FIG. 5A is a planar view of an end portion of a vortex generator according to an embodiment.
Figure 5B:
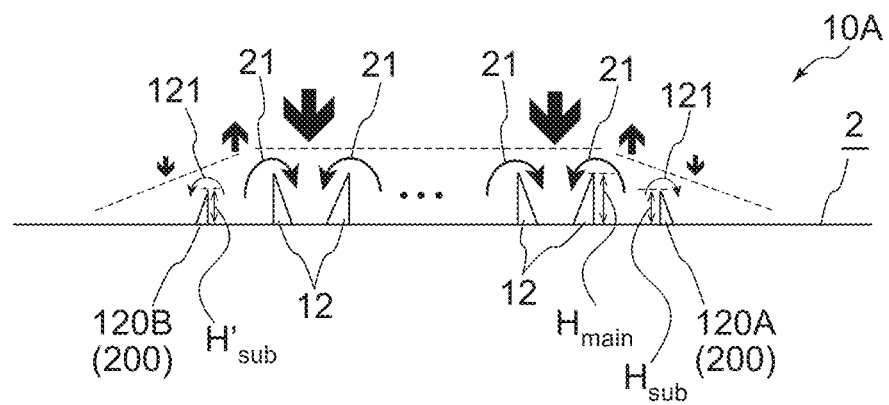
FIG. 5B is a side view of an end portion of a vortex generator according to an embodiment.

FIGS. 5A and 5B are diagrams showing a configuration example of a vortex generator 10A according to an embodiment. FIG. 5A is a planar view of the vortex generator 10, and FIG. 5B is a side view of the vortex generator 10A as seen from the upstream side with respect to the inflow direction of wind.

Figure 6A:
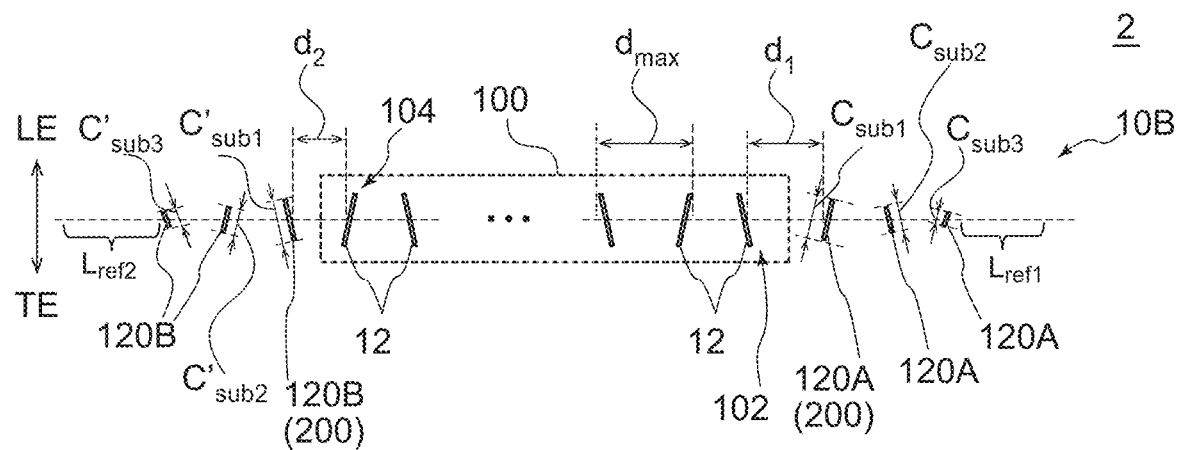
FIG. 6A is a planar view of an end portion of a vortex generator according to an embodiment.
Figure 6B:
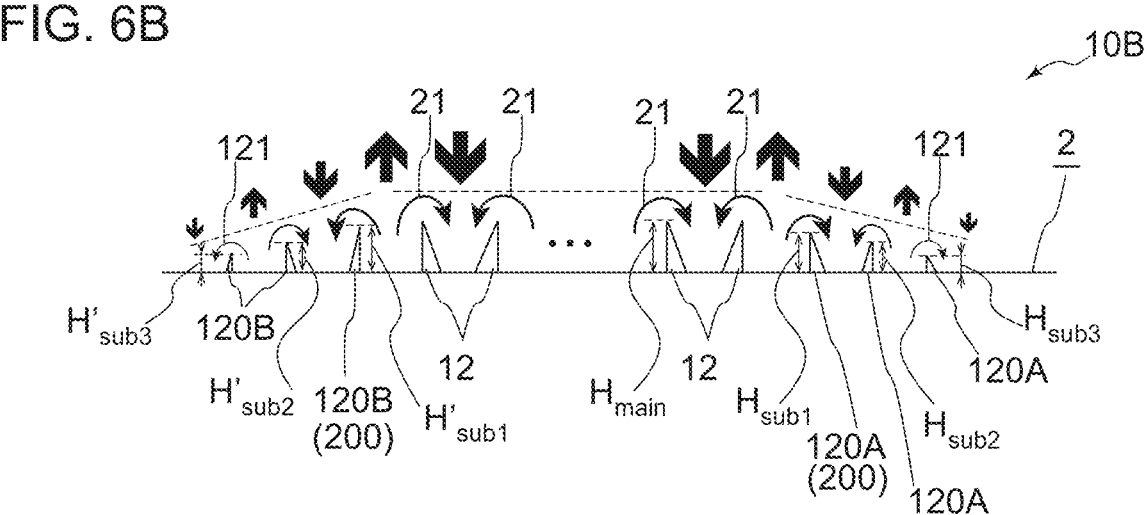
FIG. 6B is a side view of an end portion of a vortex generator according to an embodiment.

FIGS. 6A and 6B are diagrams showing a configuration example of a vortex generator 10B according to an embodiment. FIG. 6A is a planar view of the vortex generator 10, and FIG. 6B is a side view of the vortex generator 10B as seen from the upstream side with respect to the inflow direction of wind.

In some embodiments, as depicted in FIGS. 5A to 6B, the sub fins 120 include at least one first sub fin 120A disposed on the surface of the wind turbine blade 1 along a first virtual line $L_{ref1}$ extending from a first end portion 102 of the main fin row 100. The first end portion 102 is disposed on a side of the main fin row 100 that is closer to one of the blade tip 4 or the blade root 3 of the wind turbine blade 1. A single first sub fin 120A may be provided as shown in FIGS. 5A and 5B, or a plurality of first sub fins 120A may be provided as shown in FIGS. 6A and 6B.

Further, the at least one first sub fins 120A are disposed so that the first sub fin 200 which is disposed next to the first end portion 102 of the main fin row 100, of the first sub fins 120A, is at a distance $d_1$ from the main fin row 100. The distance $d_1$ between the main fin row 100 and the first sub fin 200 closest to the main fin row 100 satisfies an expression $d_1 \leq d_{max}$, provided that $d_{max}$ is the maximum distance between a pair of adjacent main fins 12A, 12B in the main fin row 100.

Further, as depicted in FIGS. 5A to 6B, the sub fins 120 include at least one second sub fin 120B disposed on the surface of the wind turbine blade 1 along a second virtual line $L_{ref2}$ extending from a second end portion 104 of the main fin row 100. The second end portion 104 is disposed on a side of the main fin row 100 that is closer to the other one of the blade tip 4 or the blade root 3 of the wind turbine blade 1. Similarly to the first sub fin 120A, a single second sub fin 120B may be provided as shown in FIGS. 5A and 5B, or a plurality of second sub fins 120B may be provided as shown in FIGS. 6A and 6B.

Further, the at least one second sub fin 120B is disposed so that the second sub fin 300 which is disposed next to the second end portion 104 of the main fin row 100, of the second sub fins 120B, is at a distance $d_2$ from the main fin row 100. The distance $d_2$ between the main fin row 100 and the second sub fin 300 closest to the main fin row 100 satisfies an expression $d_2 \leq d_{max}$, where $d_{max}$ is the maximum distance between a pair of adjacent main fins 12A, 12B in the main fin row 100.

As depicted in FIGS. 5 and 6, each sub fin 120 (120A, 120B) has a smaller fin chord length and a smaller fin height than each main fin 12 (12A, 12B). That is, provided that $C_{main}$ and $H_{main}$ are the fin chord length and the fin height of the main fin 12, respectively, the fin chord length $C_{sub}$ and the fin height $H_{sub}$ of each sub fin 120 satisfy relationships $C_{sub} < C_{main}$ and $H_{sub} < H_{main}$.

In the embodiment depicted in FIGS. 6A and 6B, the plurality of first sub fins 120A are arranged next to the first end portion 102 of the main fin row 100 in such an order that the fin chord length and the fin height decrease with distance from the main fin row 100. Specifically, in an example depicted in FIGS. 6A and 6B, three first sub fins 120A are disposed so as to Satisfy $C_{sub1} > C_{sub2} > C_{sub3}$, and, $H_{sub1} > H_{sub2} > H_{sub3}$.

Similarly, the plurality of second sub fins 120B are arranged next to the second end portion 104 of the main fin row 100 in such an order that the fin chord length and the fin height of the second sub fins 120B decrease with distance from the main fin row 100 ($C'_{sub1} > C'_{sub2} > C'_{sub3}$, and, $H'_{sub1} > H'_{sub2} > H'_{sub3}$).

In the vortex generator 10A, 10B having the above configuration, the sub fins 120A, 120B which are smaller than the main fins 12 are disposed adjacent to the main fin row 100 ($d_1 \leq d_{max}$, $d_2 \leq d_{max}$), and thus it is possible to enhance the effect to suppress separation at an end portion of the fin row of the vortex generator 10A, 10B. Specifically, with the sub fins 120A, 120B provided, it is possible to cancel, at least partially, the effect to promote separation caused by the longitudinal vortices 21 formed in a direction away from the surface of the wind turbine blade 1 by some of the main fins 12 disposed on an end portion of the main fin row 100, as vortices 121 (see FIGS. 5B and 6B) formed by the sub fins 120A, 120B attract a relatively-fast flow outside the boundary layer toward the surface of the wind turbine blade 1. Furthermore, while the sub fins 120A, 120B themselves may form vortices in a direction away from the surface of the wind turbine blade 1, the fin chord lengths $C_{sub}$, $C'_{sub}$ and the fin heights $H_{sub}$, $H'_{sub}$ of the sub fins 120A, 120B are smaller than those of the main fins 12, and thus the influence of the vortices 121 formed by the sub fins 120A, 120B is smaller than that of the vortices 21 formed by the main fins 12. Thus, it is possible to enhance the effect to suppress separation at an end portion of the fin row as the vortex generator 10A, 10B as a whole.

Figure 7:
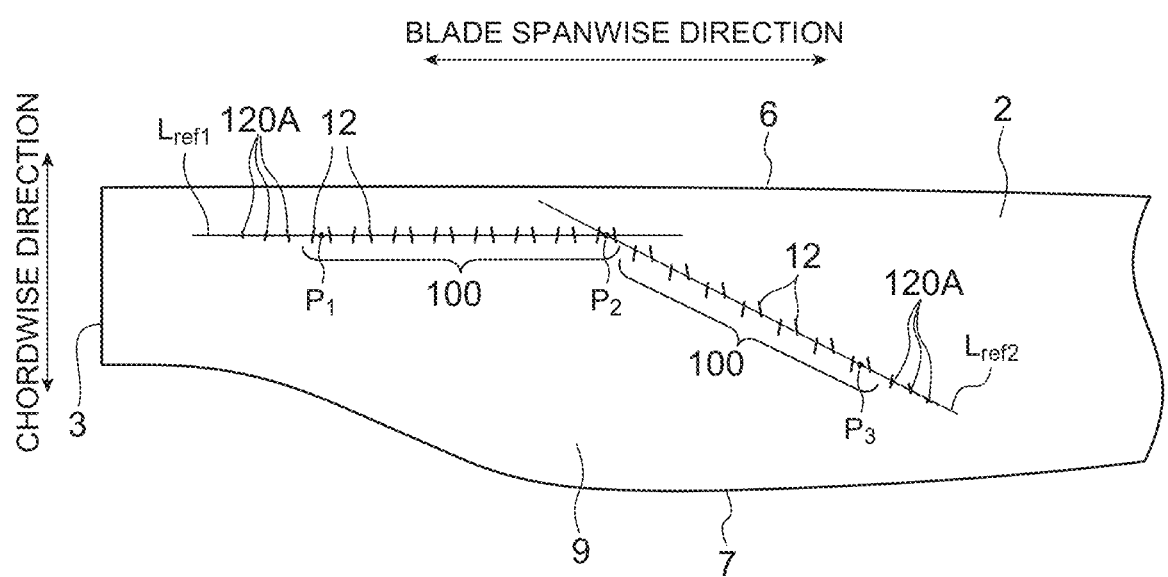
FIG. 7 is a configuration diagram of a vortex generator according to an embodiment.

In some embodiments, a plurality of vortex generators 10 may be disposed in the blade spanwise direction on the suction surface 9 of the blade body 2, for instance, linearly along the reference line $L_{ref1}$, (see FIGS. 2 and 7). In some embodiments, a plurality of vortex generators 10 may be disposed diagonally with respect to the blade spanwise direction, for instance, linearly along the reference line $L_{ref2}$ (see FIG. 7). A plurality of main fins 12a forms one or more main fin rows 100. In some embodiments, each of the fins 12 (12A, 12B) is disposed inclined to form a predetermined angle with an inflow direction of wind (see FIGS. 3 and 4).

Figure 8:
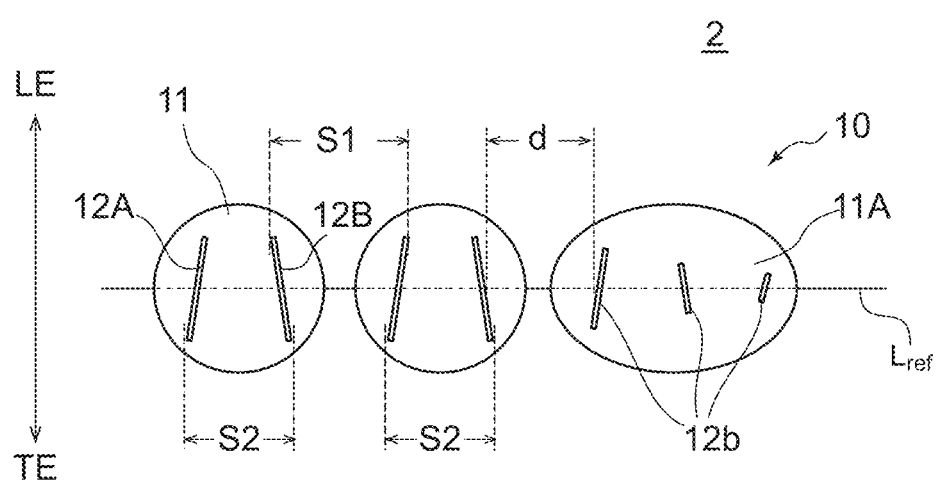
FIG. 8 is a planar view of a sub fin provided for an end portion of a vortex generator according to an embodiment.
Figure 9:
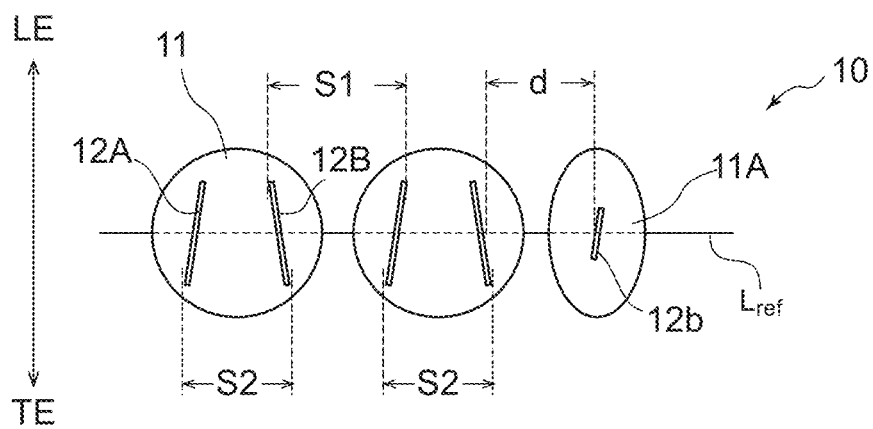
FIG. 9 is a diagram of a sub fin provided for an end portion of a vortex generator according to an embodiment.
Figure 10:
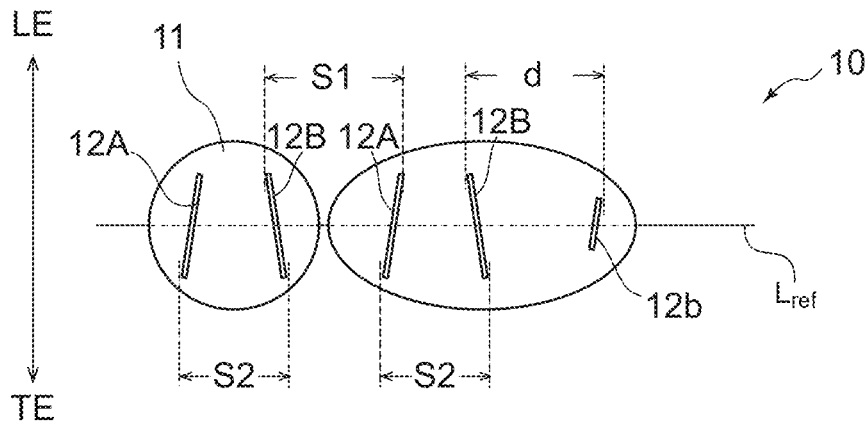
FIG. 10 is a diagram of a sub fin provided for an end portion of a vortex generator according to an embodiment.

In some embodiments, the vortex generator 10 may be disposed so that S1/S2 is at least 0.8 and at most 1.2 (S1/S2=0.8 to 1.2), provided that S1 is the distance between the maximum distance between adjacent main fins 12A and 12B, at end portions on the side closer to the leading edge 6 of the wind turbine blade 1, and S2 is the distance between the maximum distance between adjacent main fins 12A and 12B, at end portions on the side closer to the trailing edge 7 of the wind turbine blade 1 (see FIGS. 8 to 10, for instance). Accordingly, basic units of the main fins 12A and 12B are disposed at a substantially constant distance without being too apart or too close, and thus it is possible to achieve the effect to suppress separation substantially uniformly over the entire installation range of the vortex generator 10.

In some embodiments, the vortex generator 10 includes a base plate (base plate) 11 to be fixed to a surface of the wind turbine blade 1 (more specifically, to a surface of the blade body 2) and at least one fin 12 disposed upright on the base plate 11. In some embodiments, the base plate 11 may have a circular shape, an oval shape, or a polygonal shape such as a trapezoidal shape and a rectangular shape.

In some embodiments, each sub fin 120 may be disposed upright on the base plate 11A, as depicted in FIGS. 8 and 9, for instance. The base plate 11A may have an oval shape or a quadrilateral shape such as a trapezoidal shape. Accordingly, the sub fins 12B can be mounted to the wind turbine blade 1 by simply mounting the base plate 11A to the wind turbine blade 1, and thus it is possible to improve the workability for mounting the plurality of sub fins 120 to the wind turbine blade 1. Further, the sub fins 120 formed to decrease in size with distance from the main fin row 100 are formed integrally with the base plate 11, and thus it is possible to prevent the small fins 120 from being lost and to reduce the efforts for proper handling.

In some embodiments, one or more sub fins 120 and one or more main fins 12 may be disposed on the same base plate 11 (see FIG. 10, for instance). Accordingly, it is possible to further reduce the man hours for installing the vortex generator 10 on the wind turbine blade 1.

In some embodiments, the at least one sub fin 120 may be disposed on an end portion (first end portion) 102 of the main fin row 100 at the side closer to the blade tip 4 of the wind turbine blade 1 (see FIG. 2). Accordingly, it is possible to suppress the effect to promote separation with the sub fins 120 at the end portion of the fin row of the vortex generator 10, for a portion of the wind turbine blade 1 that has a great influence on the aerodynamic performance (a portion closer to the tip than the blade root portion (blade root 3)). Thus, it is possible to improve the aerodynamic performance of the wind turbine blade 1. In some embodiments, one or more sub fins 120 (second sub fins) may be disposed on an end portion (second end portion) 104 of the main fin row 100 at the side closer to the blade root 3 of the wind turbine blade 1 (see FIG. 2).

In some embodiments, the at least one sub fin 120A may be disposed so that the center of each sub fin 120A with respect to the fin chord length direction is on the extension line of the center of each of the plurality of main fins 12 with respect to the fin chord length direction. Accordingly, the aerodynamic effect achieved by the at least one sub fin 120 arranged on the extension line of the main fin row can be exerted efficiently on an end portion of the main fin row, and thus it is possible to improve the aerodynamic property of the wind turbine blade 1 efficiently.

Figure 11:
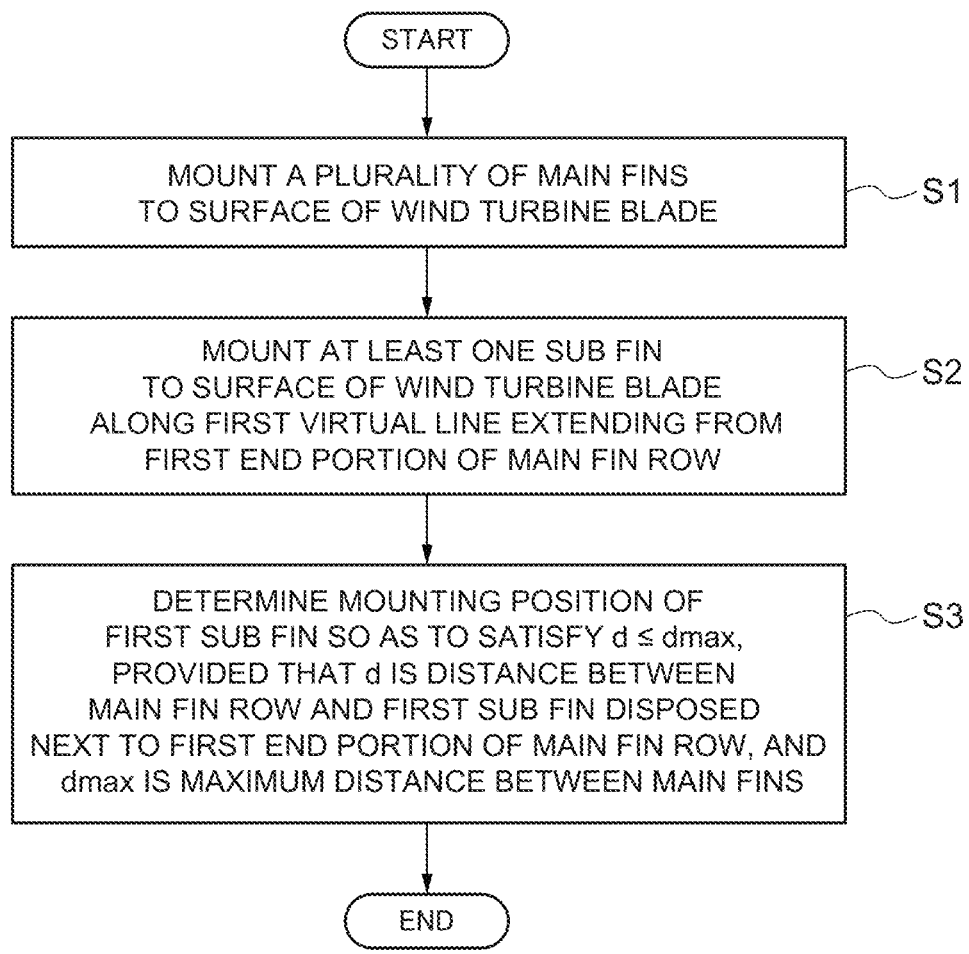
FIG. 11 is a flowchart of a method of installing a vortex generator 10 according to an embodiment.

Next, a method of installing the vortex generator 10 to the wind turbine blade 1 according to some embodiments will be described with reference to FIG. 11. FIG. 12 is a flowchart of a method of installing a vortex generator 10 according to an embodiment.

While the vortex generator 10 is mounted to the suction surface 9 of the wind turbine blade 1 (blade body 2) in an example described below, the vortex generator 10 can be mounted to the pressure surface 8 of the wind turbine blade 1 by a similar method.

As depicted in FIG. 12, a method of installing a vortex generator 10 according to some embodiments includes: a step (S1) of mounting a plurality of main fins 12 to a surface of the wind turbine blade 1, a step (S2) of mounting at least one sub fin 120 to the surface of the wind turbine blade 1, along a virtual line (the first virtual line) extending from an end portion (the first end portion) of the main fin row 100 at the side of the blade tip 4 or the blade root 3 of the wind turbine blade 1, the at least one first sub fin 120 having a fin chord length and a fin height which are smaller than those of each of the main fins 12; and a step (S3) of determining a mounting position of the sub fin 12b so as to satisfy an expression d≤$d_{max}$, provided that d is a distance between the main fin row 100 and the sub fin 120, disposed next to the first end portion of the main fin row 100, of the at least one sub fin 120, and $d_{max}$ is a maximum distance between an adjacent pair of the main fins 12A and 12B in the main fin row. Each step will be described below.

In the method of installing the vortex generator 10 according to some embodiments, a plurality of vortex generators 10 having main fins 12 are mounted to the surface of the wind turbine blade 1 (step S1). In an embodiment, the mounting position of each vortex generator 10 may be determined on the basis of fluid-analysis results on the wind turbine blade 1.

In an embodiment, an ideal mounting position of each vortex generator 10 on the wind turbine blade 1 may be calculated from fluid analysis on the wind turbine blade 1, and the ideal mounting position may be determined as the position for actually mounting each vortex generator 10.

In an embodiment, ideal mounting positions of the plurality of vortex generators 10 shown in fluid-analysis results on the wind turbine blade 1 may be approximated by one or more lines, and the mounting positions of the plurality of vortex generators 10 may be determined on the line. In some embodiments, the vortex generator 10 may be mounted to the surface (suction surface 9 in this case) of the wind turbine blade 1, so that a reference mark (not depicted) indicating orientation of the vortex generator 10 is disposed along the line $L_{ref1}$ connecting reference points $P_1$ and $P_2$. Further, in some embodiments, the vortex generator 10 may be mounted to the surface (suction surface 9 in this case) of the wind turbine blade 1, so that a reference mark indicating orientation of the vortex generator 10 is disposed along the line $L_{ref2}$ connecting reference points $P_2$ and $P_3$.

Further, as depicted in FIG. 7, the plurality of vortex generators 10 may be aligned linearly along the line $L_{ref}$, and the mounting direction of each vortex generator 10 may be adjusted with reference to the line $L_{ref}$, thereby mounting the plurality of vortex generators 10 to the wind turbine blade 1. As described above, with the plurality of vortex generators 10 mounted to the wind turbine blade 1 with reference to the single line $L_{ref}$, it is possible to mount the vortex generator 10 to the wind turbine blade 1 efficiently.

In the example depicted in FIG. 7, the vortex generators 10 are aligned linearly and mounted to the wind turbine blade 1, along each of the line $L_{ref1}$ connecting the reference points $P_1$ and $P_2$ and the line $L_{ref2}$ connecting the reference points $P_2$ and $P_3$, on the surface of the wind turbine blade 1.

The mounting position and the mounting angle of the vortex generator 10 on the wind turbine blade 1 are adjusted as described above, and then the vortex generator 10 is fixed to the wind turbine blade 1. At this time, the vortex generator 10 may be fixed to the wind turbine blade 1 with an adhesive agent or a double-sided adhesive tape.

Next, in some embodiments, at least one sub fin 12b having a smaller fin chord length and a smaller fin height than each main fin 12 is mounted to the surface of the wind turbine blade 1, along a virtual line (the first virtual line or the second virtual line) extending from an end portion (the first end portion or the second end portion) of the main fin row on the side of the blade tip 4 or the blade root 3 of the wind turbine blade 1 (step S2). At this time, the mounting position of the sub fin 120 is determined so that the distance d between the main fin row 100 and the sub fin 120 next to the first end portion of the main fin row 100, of the at least one sub fin 120, satisfies an expression d≤$d_{max}$, provided that $d_{max}$ is the maximum distance between a pair of adjacent main fins 12A, 12B in the main fin row 100 (step S3).

According to some embodiments described above, it is possible to enhance the effect to suppress separation at an end portion of the fin row for the vortex generator 10.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A vortex generator for a wind turbine blade, comprising:
   a plurality of main fins disposed on a surface of the wind turbine blade and having a same fin chord length and a same fin height; and
   a plurality of first sub fins having a fin chord length and a fin height which are smaller than those of each of the main fins, the first sub fins being disposed on the surface of the wind turbine blade along a first virtual line extending from a first end portion of a main fin row at a side of a blade tip or a blade root of the wind turbine blade,
   wherein a distance d satisfies an expression d≤$d_{max}$, provided that d is the distance between the main fin row and one of the first sub fins disposed next to the first end portion of the main fin row, and $d_{max}$ is a maximum distance between an adjacent pair of the main fins in the main fin row, and
   the first sub fins have mutually different sizes and arranged such that the fin chord lengths and the fin heights of the plurality of first sub fins decrease with distance from the main fin row.

2. The vortex generator for a wind turbine blade according to claim 1,
   wherein a fin chord length direction of the first sub fin which is farthest from the main fin row, of the plurality of first sub fins is inclined from the first virtual line so as to extend away from the main fin row toward a leading edge of the wind turbine blade.

3. The vortex generator for a wind turbine blade according to claim 1, further comprising a first base plate fixed to the surface of the wind turbine blade,
   wherein the plurality of first sub fins is disposed upright on the first base plate.

4. The vortex generator for a wind turbine blade according to claim 1, further comprising a first base plate fixed to the surface of the wind turbine blade,
   wherein at least one of the main fins which forms the first end portion of the main fin row and at least one of the first sub fins are disposed upright on the first base plate.

5. The vortex generator for a wind turbine blade according to claim 1,
   wherein the first end portion is an end portion, disposed at the side of the blade tip of the wind turbine blade, of the main fin row.

6. The vortex generator for a wind turbine blade according to claim 1,
   wherein the plurality of first sub fins is disposed so that a center of each of the first sub fins with respect to a fin chord length direction is on a line connecting respective centers of the plurality of main fins in the fin chord length direction.

7. The vortex generator for a wind turbine blade according to claim 1,
   wherein a ratio S1/S2 is at least 0.8 and at most 1.2, provided that S1 is a distance between an adjacent pair of the main fins at a leading-edge side, and S2 is a distance between an adjacent pair of the main fins at a trailing-edge side.

8. A wind turbine blade, comprising:
   a blade body elongated from a blade root portion toward a blade tip portion; and
   the vortex generator for a wind turbine blade according to claim 1.

9. A wind turbine power generating apparatus, comprising:
   a wind turbine rotor including the wind turbine blade according to claim 8 and a hub to which the wind turbine blade is mounted;
   a main shaft connected to the wind turbine rotor so as to be integrally rotatable;
   a nacelle supporting the main shaft rotatably; and
   a tower supporting the nacelle revolvably.

10. A method of installing a vortex generator according to claim 1 on a wind turbine blade, the method comprising:
    a step of mounting a plurality of main fins having a same fin chord length and a same fin height on a surface of the wind turbine blade;
    a step of mounting the plurality of first sub fins to the surface of the wind turbine blade, along a first virtual line extending from a first end portion of a main fin row at a side of a blade tip or a blade root of the wind turbine blade, the plurality of first sub fins having a fin chord length and a fin height which are smaller than those of each of the main fins; and
    a step of determining a mounting position of the first sub fin so that a distance d satisfies an expression d≤$d_{max}$, provided that d is the distance between the main fin row and the first sub fin disposed next to the first end portion of the main fin row, of the plurality of first sub fins, and $d_{max}$ is a maximum distance between an adjacent pair of the main fins in the main fin row.

11. The vortex generator for a wind turbine blade according to claim 1,
    wherein a gap between the main fin row and said one of the first sub fins disposed next to the first end portion decreases along a chord direction of the wind turbine blade toward a trailing edge side of the wind turbine blade.

12. The vortex generator for a wind turbine blade according to claim 1,
wherein the number of the first sub fins is not greater than 3.

13. A method of installing a vortex generator according to claim 1 on a wind turbine blade, the method comprising:
a step of mounting a plurality of main fins having a same fin chord length and a same fin height on a surface of the wind turbine blade;
a step of mounting a plurality of first sub fins to the surface of the wind turbine blade, along a first virtual line extending from a first end portion of a main fin row at a side of a blade tip or a blade root of the wind turbine blade, the first sub fins each having a fin chord length and a fin height which are smaller than those of each of the main fins; and
a step of determining a mounting position of the first sub fins so that a distance d satisfies an expression $d \leq d_{max}$, provided that d is the distance between the main fin row and one of the first sub fins disposed next to the first end portion of the main fin row, and $d_{max}$ is a maximum distance between an adjacent pair of the main fins in the main fin row.

14. A vortex generator for a wind turbine blade, comprising:
a plurality of main fins disposed on a surface of the wind turbine blade; and
at least one first sub fin having a fin chord length and a fin height which are smaller than those of each of the main fins, the at least one first sub fin being disposed on the surface of the wind turbine blade along a first virtual line extending from a first end portion of a main fin row at a side of a blade tip or a blade root of the wind turbine blade,
wherein a distance d satisfies an expression $d \leq d_{max}$, provided that d is the distance between the main fin row and the first sub fin disposed next to the first end portion of the main fin row, of the at least one first sub fin, and $d_{max}$ is a maximum distance between an adjacent pair of the main fins in the main fin row, and
wherein the vortex generator further comprises:
a first base plate which is fixed to the surface of the wind turbine blade and onto which at least one of the main fins which forms the first end portion of the main fin row and at least one of the first sub fin are mounted; and
a second base plate which is fixed to the surface of the wind turbine blade and onto which only one or more of the plurality of main fins are mounted, and
the first base plate has a first shape that is different from a second shape of the second base plate.

15. The vortex generator for a wind turbine blade according to claim 14,
wherein the at least one first sub fin includes a plurality of first sub fins having the fin chord length and the fin height which decrease with distance from the main fin row.

* * * * *